US012689977B2

(12) United States Patent
Kuang et al.

(10) Patent No.: US 12,689,977 B2
(45) Date of Patent: Jul. 21, 2026

(54) COMMUNICATIONS METHOD AND DEVICE

(71) Applicant: Huawei Technologies Co., Ltd., Shenzhen (CN)

(72) Inventors: Yiru Kuang, Beijing (CN); Lixia Xue, Beijing (CN); Haibo Xu, Beijing (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 426 days.

(21) Appl. No.: 18/262,529

(22) PCT Filed: Dec. 27, 2021

(86) PCT No.: PCT/CN2021/141569
§ 371 (c)(1),
(2) Date: Jul. 21, 2023

(87) PCT Pub. No.: WO2022/156485
PCT Pub. Date: Jul. 28, 2022

(65) Prior Publication Data
US 2024/0323829 A1 Sep. 26, 2024

(30) Foreign Application Priority Data

Jan. 22, 2021 (CN) .......................... 202110086444.1
Feb. 10, 2021 (CN) .......................... 202110184338.7

(51) Int. Cl.
*H04W 48/20* (2009.01)
*H04W 36/00* (2009.01)
(52) U.S. Cl.
CPC ...... *H04W 48/20* (2013.01); *H04W 36/00835* (2018.08)

(58) Field of Classification Search
CPC ........... H04W 48/20; H04W 36/00835; H04W 48/12; H04W 72/0453; H04W 72/23; H04L 5/001; H04L 5/0092; H04L 5/14
See application file for complete search history.

(56) References Cited

U.S. PATENT DOCUMENTS

| | | | |
|---|---|---|---|
| 9,479,980 B1 | 10/2016 | Naim et al. | |
| 2018/0302824 A1 | 10/2018 | Christopherson et al. | |

(Continued)

FOREIGN PATENT DOCUMENTS

| | | | | |
|---|---|---|---|---|
| CN | 107820723 A | 3/2018 | | |
| WO | WO-2013063896 A1 * | 5/2013 | .......... | H04J 11/0069 |

OTHER PUBLICATIONS

3GPP TS 38.213 V16.4.0 (Dec. 2020), 3rd Generation Partnership Project; Technical Specification Group Radio Access Network;NR; Physical layer procedures for control (Release 16), total 181 pages.

(Continued)

*Primary Examiner* — Shawn D Miller
(74) *Attorney, Agent, or Firm* — Conley Rose, P.C.

(57) ABSTRACT

A communications method includes the terminal device receiving a first message from a network device, where the first message indicates a second cell, the second cell includes a first downlink carrier and a second uplink carrier, and a duplex mode of a band to which the first downlink carrier belongs is different from a duplex mode of a band to which the second uplink carrier belongs, and the terminal device accesses the second cell.

20 Claims, 4 Drawing Sheets

```
┌──────────┐                                              ┌──────────┐
│ Network  │                                              │ Terminal │
│ device   │                                              │ device   │
└────┬─────┘                                              └────┬─────┘
     │                                                         │
     │   S401: Send a first message, where the first           │
     │   message indicates a first cell and a second cell       │
     │ ───────────────────────────────────────────────────────>│
     │                                                         │
     │   S402: The terminal device selects the first cell      │
     │   or the second cell for access                          │
     │ <───────────────────────────────────────────────────────│
     │                                                         │
```

(56)                    References Cited

U.S. PATENT DOCUMENTS

| | | | |
|---|---|---|---|
| 2018/0376510 A1* | 12/2018 | Sun | H04W 72/23 |
| 2019/0124658 A1 | 4/2019 | Wilhelmsson et al. | |
| 2019/0141773 A1 | 5/2019 | Kim et al. | |
| 2019/0254074 A1* | 8/2019 | Jeon | H04W 36/00692 |
| 2019/0327069 A1* | 10/2019 | Novlan | H04L 5/0039 |
| 2020/0396654 A1* | 12/2020 | Freda | H04W 36/0061 |

OTHER PUBLICATIONS

3GPP TS 38.212 V16.4.0 (Dec. 2020), 3rd Generation Partnership Project; Technical Specification Group Radio Access Network;NR; Multiplexing and channel coding (Release 16), total 152 pages.
3GPP TS 38.321 V16.3.0 (Dec. 2020), 3rd Generation Partnership Project; Technical Specification Group Radio Access Network;NR; Medium Access Control (MAC) protocol specification (Release 16), total 156 pages.

* cited by examiner

COMMUNICATIONS METHOD AND DEVICE

CROSS-REFERENCE TO RELATED APPLICATIONS

This is a National Stage of International Patent Application No. PCT/CN2021/141569 filed on Dec. 27, 2021, which claims priority to Chinese Patent Application No. 202110086444.1 filed on Jan. 22, 2021 and Chinese Patent Application No. 202110184338.7 filed on Feb. 10, 2021. All of the aforementioned applications are hereby incorporated by reference in their entireties.

TECHNICAL FIELD

Embodiments of this application relate to the field of communications technologies, and in particular, to a communications method and a device.

BACKGROUND

With an increasing bandwidth requirement of a user, a high-frequency band with a greater available bandwidth becomes a candidate band of a new radio (new radio. NR) system. Because a higher frequency indicates greater signal attenuation, and a transmit power of a network device is higher than a transmit power of a terminal device, when an NR cell is deployed, there is a problem that a terminal device located in an edge area of the cell can receive a signal from the network device, but the network device cannot receive a signal from the terminal device. In other words, there is a problem of asymmetric uplink and downlink coverage areas of the cell because an uplink (uplink, UL) coverage area of the cell is smaller than a downlink (downlink, DL) coverage area of the cell.

Currently, for the problem of asymmetric uplink and downlink coverage areas of the cell, an existing solution is as follows: In addition to an original high-frequency uplink band of the cell, an additional lower-frequency uplink band is introduced, to send an uplink signal, where the lower-frequency uplink band is a supplementary uplink (supplementary uplink, SUL) band or a secondary uplink band, and the original high-frequency uplink band is a normal uplink (normal UL) band or a non-supplementary uplink (non-SUL) band. The SUL band has smaller signal attenuation. Therefore, the uplink and downlink coverage areas of the cell can be consistent, and symmetric uplink and downlink coverage areas can be achieved. However, to supplement the uplink coverage area by using the SUL band, the terminal device needs to additionally add hardware, for example, a power amplifier, that supports the SUL band. Consequently, costs and a size of the terminal device increase, and user experience is affected.

SUMMARY

Embodiments of this application provide a communications method and a device, to achieve symmetric uplink and downlink coverage areas of a cell without increasing internal complexity of a terminal device.

According to a first aspect, an embodiment of this application provides a communications method. The method includes: A terminal device receives a first message from a network device, where the first message indicates a first cell and a second cell, the first cell includes a first downlink carrier and a first uplink carrier, and the second cell includes the first downlink carrier and a second uplink carrier, a duplex mode of a band to which the first downlink carrier belongs is the same as a duplex mode of a band to which the first uplink carrier belongs, and the duplex mode of the band to which the first downlink carrier belongs is different from a duplex mode of a band to which the second uplink carrier belongs; and the terminal device selects the first cell or the second cell for access. Optionally, the band to which the first downlink carrier belongs is the same as the band to which the first uplink carrier belongs, and the band to which the second uplink carrier belongs is lower than the band to which the first uplink carrier belongs.

In this embodiment of this application, a downlink carrier on a TDD band and an uplink carrier on a lower-frequency FDD band may flexibly form an uplink-downlink carrier pair, and are paired to form a new cell, so that uplink and downlink coverage areas of the new cell may be equivalent. In addition, the terminal device does not need to support a SUL band, so that symmetric uplink and downlink coverage areas of the cell can be achieved without increasing internal complexity of the terminal device.

In a possible design, that the terminal device selects the first cell or the second cell for access includes: The terminal device obtains downlink channel quality of the first cell or the second cell; and when the downlink channel quality is greater than or equal to a first threshold value, the terminal device selects the first cell for access, or when the downlink channel quality is less than a first threshold value, the terminal device selects the second cell for access.

In the foregoing design, when the terminal device is located in an edge area of the first downlink carrier, the terminal device may select, based on the downlink channel quality of the cell, the second cell having a greater uplink coverage area for access. This helps ensure communication quality of the terminal device.

In a possible design, that the terminal device selects the first cell or the second cell for access includes: The terminal device obtains uplink load information of the first cell and the second cell; and when an uplink load of the first cell is less than or equal to an uplink load of the second cell, the terminal device selects the first cell for access, or when an uplink load of the first cell is greater than an uplink load of the second cell, the terminal device selects the second cell for access.

In the foregoing design, the terminal device may select, based on an uplink load status of a cell, a cell having a lighter uplink load for access. This helps implement load balancing between the first cell and the second cell.

In a possible design, that the terminal device selects the first cell or the second cell for access includes: When the terminal device supports access from the second cell, the terminal device selects the second cell for access, or when the terminal device does not support access from the second cell, the terminal device selects the first cell for access.

In the foregoing design, the terminal device may select, based on a carrier capability supported by the terminal device, a supported cell for access. This helps ensure communication quality of the terminal device.

In a possible design, the method further includes: The terminal device receives a second message from the network device, where the second message indicates the terminal device to access the first cell or access the second cell. That the terminal device selects the first cell or the second cell for access includes: The terminal device selects, based on the second message, the first cell or the second cell for access.

In the foregoing design, the terminal device may select, based on an indication of the network device, a cell for access. This helps ensure communication quality of the terminal device.

In a possible design, the method further includes: The terminal device receives a third message from the network device, where the third message includes one or more of a second threshold value, a third threshold value, a fourth threshold value, and a fifth threshold value; the second threshold value and the third threshold value are used to start neighboring cell measurement and neighboring cell reselection performed on the first cell; and the fourth threshold value and the fifth threshold value are used to start neighboring cell measurement and neighboring cell reselection performed on the second cell; and the terminal device starts, based on the third message, neighboring cell measurement and/or neighboring cell reselection performed on the first cell or the second cell.

In the foregoing design, the network device may separately indicate, for the first cell and the second cell that share a same downlink carrier, the terminal device to start downlink channel quality threshold values for neighboring cell measurement and neighboring cell reselection. This helps prevent the terminal device from performing cell handover in advance or delaying cell handover.

In a possible design, the method further includes: The terminal device receives a fourth message from the network device, where the fourth message indicates the terminal device to hand over from a current cell to a target cell and indicates a configuration of the target cell, the configuration of the target cell includes a physical cell identifier of the target cell and/or a lower-layer configuration, and indicating the terminal device to hand over from the current cell to the target cell includes indicating the terminal device to hand over from the first cell to the second cell or hand over from the second cell to the first cell; and the terminal device hands over to the target cell and applies the physical cell identifier of the target cell and/or the lower-layer configuration.

In a possible design, the method further includes: When the configuration of the target cell further includes a cell radio network temporary identifier C-RNTI used in the target cell by the terminal device, the terminal device hands over to the target cell and applies the C-RNTI, the physical cell identifier of the target cell, and/or the lower-layer configuration.

In the foregoing design, when the terminal device hands over between the first cell and the second cell, a simplified handover process may be performed, and behaviors such as downlink-related downlink synchronization, specific broadcast signal configuration, master information block obtaining, and medium access control entity reconfiguration do not need to be performed. This helps reduce complexity of cell handover performed by the terminal device, and shorten a data interruption time period caused by the cell handover.

In a possible design, the method further includes: The terminal device determines a common physical cell identifier based on a primary synchronization signal SSS and/or secondary synchronization information PSS of the first downlink carrier; and the terminal device determines a physical cell identifier of the first cell and a physical cell identifier of the second cell based on the common physical cell identifier.

In the foregoing design, one set of SSS and/or PSS may be used to indicate the physical cell identities of the first cell and the second cell. This helps reduce signaling overheads.

According to a second aspect, an embodiment of this application provides a communications method. The method includes: The terminal device receives a first message from a network device, where the first message indicates a second cell, the second cell includes a first downlink carrier and a second uplink carrier, and a duplex mode of a band to which the first downlink carrier belongs is different from a duplex mode of a band to which the second uplink carrier belongs; and the terminal device accesses the second cell.

In this embodiment of this application, a downlink carrier in a TDD band and an uplink carrier in a lower-frequency FDD band may flexibly form an uplink-downlink carrier pair, and are paired to form a new cell, so that uplink and downlink coverage areas of the new cell may be equivalent. In addition, the terminal device does not need to support a SUL band, so that symmetric uplink and downlink coverage areas of the cell can be achieved without increasing internal complexity of the terminal device.

In a possible design, the band to which the second uplink carrier belongs is lower than the band to which the first downlink carrier belongs.

According to a third aspect, an embodiment of this application provides a communications method. The method includes: A network device sends a first message to a terminal device, where the first message indicates a first cell and a second cell, the first cell includes a first downlink carrier and a first uplink carrier, the second cell includes the first downlink carrier and a second uplink carrier, a duplex mode of a band to which the first downlink carrier belongs is the same as a duplex mode of a band to which the first uplink carrier belongs, and the duplex mode of the band to which the first downlink carrier belongs is different from a duplex mode of a band to which the second uplink carrier belongs.

In a possible design, the band to which the first downlink carrier belongs is the same as the band to which the first uplink carrier belongs, and the band to which the second uplink carrier belongs is lower than the band to which the first uplink carrier belongs.

In a possible design, the method further includes: The network device sends a second message to the terminal device, where the second message indicates the terminal device to access the first cell or access the second cell.

In a possible design, the method further includes: The network device sends a third message to the terminal device, where the third message includes one or more of a second threshold value, a third threshold value, a fourth threshold value, and a fifth threshold value; the second threshold value and the third threshold value are used to start neighboring cell measurement and neighboring cell reselection performed on the first cell; and the fourth threshold value and the fifth threshold value are used to start neighboring cell measurement and neighboring cell reselection performed on the second cell.

In a possible design, the method further includes: The network device sends a fourth message to the terminal device, where the fourth message indicates the terminal device to hand over from a current cell to a target cell and indicates a configuration of the target cell, the configuration of the target cell includes a physical cell identifier of the target cell and/or a lower-layer configuration, and indicating the terminal device to hand over from the current cell to the target cell includes indicating the terminal device to hand over from the first cell to the second cell or hand over from the second cell to the first cell.

In a possible design, when a cell radio network temporary identifier C-RNTI used by the terminal device to hand over from the current cell to the target cell changes, the configuration of the target cell further includes a C-RNTI used in the target cell by the terminal device.

In a possible design, the method further includes: The network device starts data scheduling in the target cell when duration for sending the fourth message reaches a duration threshold; or the network device starts data scheduling in the target cell when the network device receives a scheduling request sent by the terminal device in the target cell.

According to a fourth aspect, an embodiment of this application provides a communications method. The method includes: A network device sends a first message to a terminal device, where the first message indicates a second cell, the second cell includes a first downlink carrier and a second uplink carrier, and a duplex mode of a band to which the first downlink carrier belongs is different from a duplex mode of a band to which the second uplink carrier belongs.

In a possible design, the band to which the second uplink carrier belongs is lower than the band to which the first downlink carrier belongs.

According to a fifth aspect, an embodiment of this application provides a communications apparatus. The apparatus has a function of implementing the method according to any one of the first aspect or the possible designs of the first aspect, or a function of implementing the method according to any one of the second aspect or the possible designs of the second aspect. The function may be implemented by hardware, or may be implemented by hardware executing corresponding software. The hardware or software includes one or more units (modules) corresponding to the foregoing function, for example, a communications unit and a processing unit.

In a possible design, the apparatus may be a chip or an integrated circuit.

In a possible design, the apparatus includes a processor and an interface circuit. The processor is coupled to the interface circuit, and is configured to implement the function of implementing the method in the first aspect or any one of the possible designs of the first aspect, or implement the function of implementing the method in the second aspect or any one of the possible designs of the second aspect. It may be understood that the interface circuit may be a transceiver or an input/output interface. The apparatus may further include a memory. The memory stores a program that may be executed by the processor and that is used to implement the function of implementing the method in the first aspect or any one of the possible designs of the first aspect, or implement the function of implementing the method in the second aspect or any one of the possible designs of the second aspect.

In a possible design, the apparatus may be a terminal device.

According to a sixth aspect, an embodiment of this application provides a communications apparatus. The apparatus has a function of implementing the method according to any one of the third aspect or the possible designs of the third aspect, or a function of implementing the method according to any one of the fourth aspect or the possible designs of the fourth aspect. The function may be implemented by hardware, or may be implemented by hardware executing corresponding software. The hardware or software includes one or more units (modules) corresponding to the foregoing function, for example, a communications unit and a processing unit.

In a possible design, the apparatus may be a chip or an integrated circuit.

In a possible design, the apparatus includes a processor and an interface circuit. The processor is coupled to the interface circuit, and is configured to implement the function of implementing the method in the third aspect or any one of the possible designs of the third aspect, or implement the function of implementing the method in the fourth aspect or any one of the possible designs of the fourth aspect. It may be understood that the interface circuit may be a transceiver or an input/output interface. The apparatus may further include a memory. The memory stores a program that may be executed by the processor and that is used to implement the function of implementing the method in the third aspect or any one of the possible designs of the third aspect, or implement the function of implementing the method in the fourth aspect or any one of the possible designs of the fourth aspect.

In a possible design, the apparatus may be a network device.

According to a seventh aspect, an embodiment of this application further provides a communications system. The system includes a terminal device and a network device. The terminal device may perform the method in the first aspect or any one of the possible designs of the first aspect, and the network device may perform the method in the third aspect or any one of the possible designs of the third aspect. Alternatively, the terminal device may perform the method in the second aspect or any one of the possible designs of the second aspect, and the network device may perform the method in the fourth aspect or any one of the possible designs of the fourth aspect.

According to an eighth aspect, an embodiment of this application provides a computer-readable storage medium. The computer-readable storage medium has a computer program or instructions used to implement the method in the first aspect or any one of the possible designs of the first aspect, the method in the second aspect or any one of the possible designs of the second aspect, the method in the third aspect or any one of the possible designs of the third aspect, or the method in the fourth aspect or any one of the possible designs of the fourth aspect.

According to a ninth aspect, an embodiment of this application further provides a computer program product, including a computer program or instructions. When the computer program is executed or the instructions are executed, the method in the first aspect or any one of the possible designs of the first aspect may be implemented, or the method in the second aspect or any one of the possible designs of the second aspect may be implemented, or the method in the third aspect or any one of the possible designs of the third aspect may be implemented, or the method in the fourth aspect or any one of the possible designs of the fourth aspect may be implemented.

According to a tenth aspect, an embodiment of this application further provides a chip system. The chip system includes a processor and an interface. The processor is configured to invoke a computer program from the interface and run the computer program. When the processor executes the computer program, the method in the first aspect or any one of the possible designs of the first aspect may be implemented, or the method in the second aspect or any one of the possible designs of the second aspect may be implemented, or the method in the third aspect or any one of the possible designs of the third aspect may be implemented, or the method in the fourth aspect or any one of the possible designs of the fourth aspect may be implemented.

For technical effects that can be achieved in the third aspect to the tenth aspect, refer to the technical effects that can be achieved in the first aspect and the second aspect. Details are not described herein again.

DESCRIPTION OF EMBODIMENTS

Figures 1, 2:
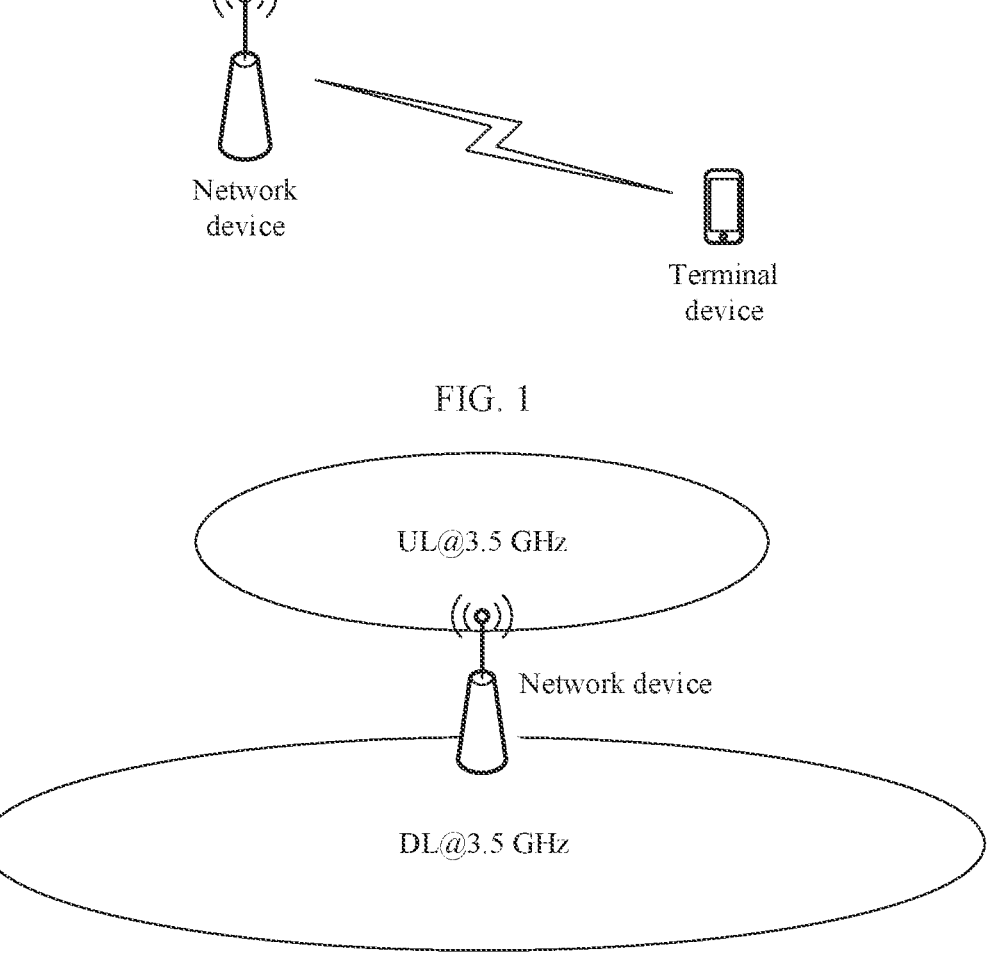
FIG. 1 is a schematic diagram of a network architecture according to an embodiment of this application.
FIG. 2 is a schematic diagram 1 of a cell coverage area according to an embodiment of this application.

Technical solutions in embodiments of this application may be applied to various communications systems, for example, a 5th generation (5th generation, 5G) system or an NR system, or may be applied to a future communications system or another similar communications system, for example, a 6G system. Specifically, an architecture of a communications system to which embodiments of this application are applied may be shown in FIG. 1. The communications system includes a network device and a terminal device. The network device and the terminal device may perform uplink communication and downlink communication. It should be noted that quantities of terminal devices and network devices in the communications system shown in FIG. 1 are not limited in embodiments of this application.

Before embodiments of this application are described, some terms in embodiments of this application are first described, to help a person skilled in the art have a better understanding.

(1) The terminal device may be a device having a wireless transceiver function, or may be referred to as a terminal. The terminal device may be deployed on land, where the deployment includes indoor or outdoor, or handheld or vehicle-mounted deployment, may be deployed on water (for example, on a ship), or may be deployed in air (for example, on aircraft, a balloon, or a satellite). The terminal device may be user equipment (user equipment, UE). The UE includes a handheld device, a vehicle-mounted device, a wearable device, or a computing device having a wireless communication function. For example, the UE may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In embodiments of this application, an apparatus configured to implement a function of the terminal device may be a terminal device, or may be an apparatus, for example, a chip system, that can support the terminal device in implementing the function. The apparatus may be installed in the terminal device, or may be used together with the terminal device. In embodiments of this application, the chip system may include a chip, or may include a chip and another discrete component. For ease of description, in embodiments of this application, an example in which the apparatus configured to implement the function of the terminal device is a terminal device is used for description.

(2) The network device may be a device that is deployed in a radio access network and that can perform wireless communication with the terminal device. The network device may be a node in the radio access network, and may also be referred to as a base station, or may be referred to as a radio access network (radio access network, RAN) node (or device). Currently, for example, the network device is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a base band unit (base band unit, BBU), or a wireless fidelity (wireless fidelity, Wi-Fi) access point (access point, AP). In addition, in a network structure, the network device may include a centralized unit (centralized unit, CU) node and/or a distributed unit (distributed unit, DU) node. The CU performs some functions of the gNB, and the DU performs some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. In embodiments of this application, an apparatus configured to implement a function of the network device may be a network device, or may be an apparatus, for example, a chip system, that can support the network device in implementing the function. The apparatus may be installed in the network device, or may be used together with the network device. For ease of description, in embodiments of this application, an example in which the apparatus configured to implement the function of the network device is a network device is used for description.

(3) FR1 and FR2: An NR frequency range includes a frequency range 1 (frequency range 1, FR1) and a frequency range 2 (frequency range 2, FR2). The FR1 is a 5G sub-6 GHz (below 6 GHz) low-frequency band. The FR2 is a high-frequency band above 6 GHz, for example, a 5G millimeter-wave band.

(4) Band (band): A band is defined in the 3rd generation partnership project (3rd generation partnership project, 3GPP) protocol, and information such as an uplink frequency range, a downlink frequency range, and a duplex mode (duplex mode) that correspond to the band is defined. For example, an uplink frequency range corresponding to a band n1 is from 1920 MHz to 1980 MHz, a downlink frequency range is from 2110

MHz to 2170 MHz, and a duplex mode is frequency-division duplex (frequency-division duplex, FDD); an uplink frequency range corresponding to a band n2 is from 1850 MHz to 1910 MHz, a downlink frequency range is from 1930 MHz to 1990 MHz, and a duplex mode is FDD; . . . ; and an uplink frequency range corresponding to a band n77 is from 3300 MHz to 4200 MHz, a downlink frequency range is from 3300 MHz to 4200 MHz, and a duplex mode is time-division duplex (time-division duplex, TDD).

Currently, a prerequisite for a terminal device to perform communication (for example, making a call, browsing a web page, or using an application (application, APP)) is to access a network of an operator (for example, China Mobile, China Unicom, or China Telecom). However, quality of the network accessed by the terminal device directly affects communication experience of a user. As shown in FIG. 2, an example in which a terminal device finds the band n77 when being powered on, finds an available frequency in the band n77, and accesses a network by using a cell of the frequency is used. The band n77 is mainly a frequency range near a 3.5 GHz spectrum. A 3.5 GHz frequency includes one uplink carrier and one downlink carrier that are single carriers (the uplink carrier and the downlink carrier) when the terminal device works in the cell. Because a transmit power of the network device is higher than a transmit power of the terminal device, there is a problem that an uplink coverage area of the cell is smaller than a downlink coverage area of the cell.

Figures 3, 4:
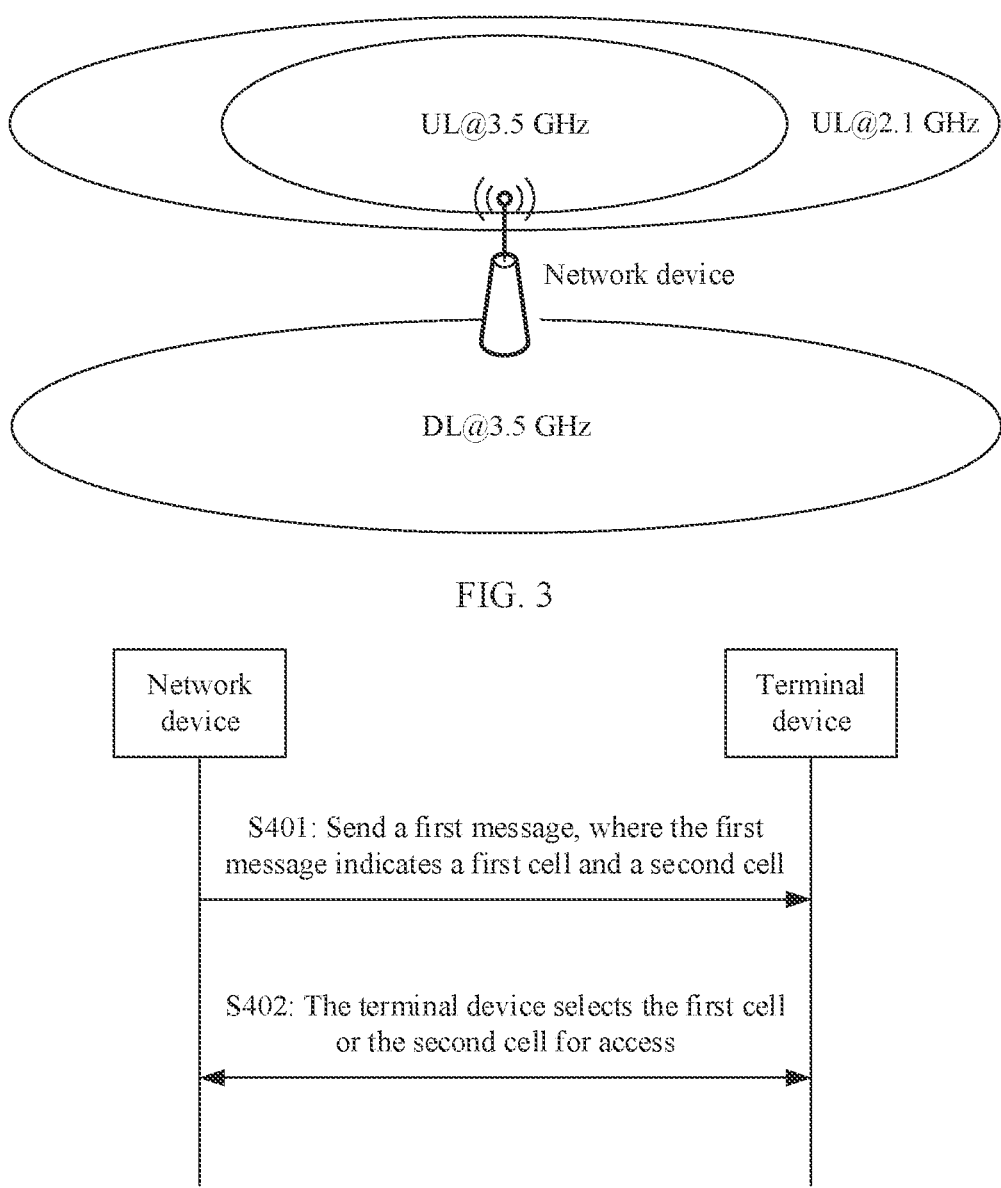
FIG. 3 is a schematic diagram 2 of a cell coverage area according to an embodiment of this application.
FIG. 4 is a schematic diagram 1 of a communications method according to an embodiment of this application.

In addition, as shown in FIG. 3, an additional lower-frequency SUL band is introduced in addition to an original high-frequency uplink band of the cell to send an uplink signal. In this way, the problem that the uplink coverage area of the cell is smaller than the downlink coverage area of the cell can be resolved. However, hardware supporting the SUL band needs to be additionally added to the terminal device. Consequently, costs and a size of the terminal device increase, and user experience is affected.

This application aims to provide a communications solution. A new cell is defined, so that symmetric uplink and downlink coverage areas of the cell are achieved without increasing internal complexity of the terminal device.

It should be understood that, in this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" usually indicates an "or" relationship between associated objects. In addition, unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different. Numerals used in this application are merely used for differentiation for ease of description, and are not used to limit the scope of embodiments of this application. The sequence numbers of the foregoing processes do not mean execution sequences, and the execution sequences of the processes should be determined based on functions and internal logic of the processes. In this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding. The following describes embodiments of this application in detail with reference to the accompanying drawings.

FIG. 4 is a schematic diagram of a communications method according to an embodiment of this application. The method includes the following steps.

S401: A network device sends a first message to a terminal device, and the terminal device receives the first message, where the first message indicates a first cell and a second cell, the first cell includes a first downlink carrier and a first uplink carrier, and the second cell includes the first downlink carrier and a second uplink carrier.

A duplex mode of a band to which the first downlink carrier belongs is the same as a duplex mode of a band to which the first uplink carrier belongs, and the duplex mode of the band to which the first downlink carrier belongs is different from a duplex mode of a band to which the second uplink carrier belongs. Specifically, it may be that the band to which the first downlink carrier belongs is a TDD band, and the band to which the second uplink carrier belongs is an FDD band; or the band to which the first downlink carrier belongs is an FDD band, and the band to which the second uplink carrier belongs is a TDD band.

A band is defined in the 3GPP protocol. For a cell belonging to the TDD band, because a transmit power of the network device is higher than a transmit power of the terminal device, there is a problem that a downlink coverage area of the cell is greater than an uplink coverage area of the cell. However, in actual application, usually, a coverage area of a 5G millimeter-wave downlink carrier is equivalent to that of a 6 GHz uplink carrier, a coverage area of a 6 GHz downlink carrier is equivalent to that of a 2.6 GHz uplink carrier, and a coverage area of a 3.5 GHz downlink carrier is equivalent to that of a 2.1 GHz uplink carrier. To achieve symmetric uplink and downlink coverage areas of a cell, in this embodiment of this application, based on the cell belonging to the TDD band, a downlink carrier of the cell may be multiplexed. The downlink carrier belonging to the TDD band and the uplink carrier belonging to the FDD band flexibly form an uplink-downlink carrier pair, and are paired to form a new cell. Alternatively, it may be understood that the downlink carrier of the cell on the TDD band is multiplexed, and the downlink carrier belonging to the TDD band and the uplink carrier belonging to the FDD band flexibly form an uplink-downlink carrier pair, and are paired to form a new cell. The new cell and the existing cell on the TDD band are both deployed under one network device, to share a downlink carrier on a same TDD band.

In an example, for the first cell (including the first downlink carrier and the second uplink carrier) belonging to the TDD band, the first downlink carrier of the first cell may be multiplexed. The first downlink carrier and the second uplink carrier that belongs to the FDD band are paired to form a new cell, namely, the second cell. The TDD band is a band whose corresponding duplex mode is TDD, for example, the band n77. The FDD band is a band whose corresponding duplex mode is FDD, for example, the band n1.

Figure 5:
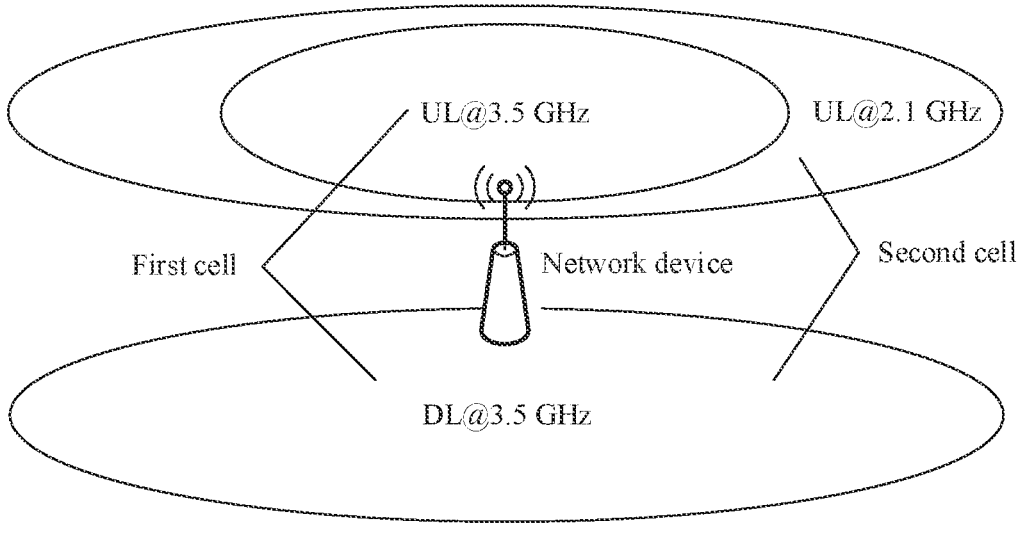
FIG. 5 is a schematic diagram 3 of a cell coverage area according to an embodiment of this application.

Because a lower frequency indicates smaller signal attenuation, in a possible implementation, to make uplink and downlink coverage areas of the second cell symmetric, the band to which the second uplink carrier included in the second cell belongs is lower than the band to which the first uplink carrier belongs. As shown in FIG. 5, the first cell includes a first downlink carrier corresponding to a frequency 3.5 GHz and a first uplink carrier corresponding to the frequency 3.5 GHz, the second cell may multiplex the first downlink carrier corresponding to the frequency 3.5 GHz, and a second uplink carrier of the second cell may use an uplink carrier corresponding to a frequency 2.1 GHz. The band "band n1" to which the second uplink carrier belongs is lower than the band "band n77" to which the first uplink carrier belongs. Coverage areas of the first downlink carrier and the second uplink carrier that are of the second cell are equivalent and basically symmetric.

In addition, each existing cell has a primary synchronization signal (primary synchronization signal, PSS)/secondary synchronization signal (secondary synchronization signal, SSS) and system information (system information, SI) of the cell. The PSS/SSS may be used to perform downlink synchronization and calculate a physical cell identifier (physical-layer cell identity, PCI) of the cell. The system information may be used to broadcast cell-related configuration information, for example, a downlink configuration and an uplink configuration of the cell. As shown in Table 1, the system information includes common configuration information of a serving cell, and the common configuration information of the serving cell includes fields such as a DL configuration information field (indicating downlink configuration information), a UL configuration information field (used to indicate uplink configuration information), and a SUL configuration information field (used to indicate supplementary uplink configuration information). The DL configuration information field is mandatory, some information in the UL configuration information field is optional, and the SUL configuration information field is optional. The cell is optional when the SUL configuration information field exists in the cell. For a cell belonging to the TDD band, downlink configuration information that is of the cell and that is indicated in a broadcast manner in the system information includes a band number and carrier frequency information of the downlink carrier on the TDD band; and uplink configuration information that is of the cell and that is indicated in a broadcast manner in the system information does not need to include a band number and carrier frequency information of the uplink carrier on the TDD band. For the cell belonging to the TDD band, an uplink carrier and a downlink carrier of the cell have a default pairing relationship, that is, the band number and the carrier frequency information of the downlink carrier are the same as the band number and the carrier frequency information of the uplink carrier. For a cell belonging to the FDD band, downlink configuration information and uplink configuration information that are of the cell and that are indicated in a broadcast manner in the system information include a band number and carrier frequency information of the downlink carrier on the FDD band, and a band number and carrier frequency information of the uplink carrier on the FDD band. In addition, the downlink carrier on the FDD band is paired with the uplink carrier on the FDD band.

TABLE 1

| System information: |
| --- |
| DL configuration information (mandatory) |
| UL configuration information (optional) |
| SUL configuration information (optional) |

In this embodiment of this application, the second cell may be a cell formed by pairing the downlink carrier on the TDD band and the uplink carrier on the FDD band. When it is considered that the second cell and the first cell share a same first downlink carrier, as shown in Table 2, the network device may add a new optional field, for example, a UL configuration information 2 field, to the system information used to broadcast related configuration information of the first cell, so as to indicate the uplink configuration information of the second cell. The uplink configuration information of the second cell includes a band number and/or carrier frequency information of the second uplink carrier.

TABLE 2

| System information: |
| --- |
| DL configuration information (mandatory) |
| UL configuration information (optional) |
| SUL configuration information (optional) |
| UL configuration information 2 (optional) |

In an example, the network device may send, to the terminal device by using a first message, the system information indicating the first cell and the second cell. The first message may be RRC dedicated signaling, or may be a message broadcast by the network device in a system information block (system information block, SIB) (for example, in a SIB 1), or the like.

S402: The terminal device selects the first cell or the second cell for access.

The first cell and the second cell share the first downlink carrier. Therefore, for cell selection and access, the terminal device may perform cell selection and access based on information such as an uplink coverage area of the cell, an uplink load of the cell, and a capability of the terminal device. The following provides description with reference to a specific example.

Manner 1: The terminal device selects, based on downlink channel quality, the first cell or the second cell for access.

Quality of the first downlink carrier is affected by a transmission distance, a transmission environment, and the like, and presents a decreasing trend as a distance between the terminal device and the network device increases. Consequently, the downlink channel quality of the first cell and the second cell decreases as the distance between the terminal device and the network device increases. Therefore, the terminal device may identify, based on the downlink channel quality of the first cell or the second cell, whether the terminal device is located in a central coverage region of the first downlink carrier or an edge coverage region of the first downlink carrier, and select, based on the area in which the terminal device is located, the first cell or the second cell for access. The downlink channel quality may be a measurement value of a signal or channel in a downlink direction of the first cell or the second cell, and includes but is not limited to one or more of a reference signal received power (reference signal received power, RSRP), reference signal received quality (reference signal received quality, RSRQ), a signal to interference plus noise ratio (signal to interference plus noise ratio, SINR), and the like.

In a possible implementation, when selecting the first cell or the second cell for access, the terminal device may measure the downlink channel quality of the first cell or the second cell. When the downlink channel quality is greater than or equal to a first threshold value, the terminal device selects the first cell for access; or when the downlink channel quality is less than a first threshold value, the terminal device selects the second cell for access. In addition, it should be understood that when the downlink channel quality includes more of the RSRP, the RSRQ, the SINR, and the like, there are a plurality of corresponding first threshold values. It may be that when all the downlink channel quality is greater than or equal to the corresponding first threshold values, the terminal device determines that the downlink channel quality is greater than the first threshold value. Alternatively, it may be that when any measurement value of the downlink channel quality is greater than or equal to a corresponding first threshold value, the terminal device determines that the downlink channel quality is greater than the first threshold value.

For example, the downlink channel quality includes the RSRP and the RSRQ, and the first threshold value includes an RSRP threshold value and an RSRQ threshold value. It may be that only when the RSRP is greater than or equal to the RSRP threshold value and the RSRQ is greater than or equal to the RSRQ threshold value, the terminal device determines that the downlink channel quality is greater than or equal to the first threshold value. Otherwise, the terminal device determines that the downlink channel quality is less than the first threshold value. Alternatively, it may be that when either of the following conditions is met: the RSRP is greater than or equal to the RSRP threshold value, or the RSRQ is greater than or equal to the RSRQ threshold value, the terminal device determines that the downlink channel quality is greater than or equal to the first threshold value.

The first threshold value may be sent by the network device to the terminal device by using a broadcast (for example, a SIB 1) or multicast message, or by using RRC dedicated signaling, or other RRC configuration signaling, or MAC control element (control element, CE) signaling. Alternatively, the first threshold value may be preconfigured in the terminal device by using a protocol or the like.

Manner 2: The terminal device selects, based on uplink load information, the first cell or the second cell for access.

In a possible implementation, the network device may periodically send the uplink load information (for example, an occupation percentage of an uplink bandwidth resource) of the first cell and the second cell to the terminal device, or may send the uplink load information (for example, an occupation percentage of an uplink bandwidth resource) of the first cell and the second cell to the terminal device after sending the first message to the terminal device. The terminal device may select a cell with a lighter uplink load from the first cell and the second cell for access. For example, when an uplink load of the first cell is less than or equal to an uplink load of the second cell, the terminal device selects the first cell for access; or when an uplink load of the first cell is greater than an uplink load of the second cell, the terminal device may select the second cell for access.

The uplink load information may be sent by the network device to the terminal device by using a broadcast (for example, a SIB 1) or multicast message, or by using RRC dedicated signaling, or other RRC configuration signaling, or MAC CE signaling.

Manner 3: The terminal device selects, based on capability information of the terminal device, the first cell or the second cell for access.

In an example, when the terminal device supports access from the second cell, that is, when the terminal device supports the second uplink carrier, the terminal device selects the second cell for access; or when the terminal device does not support access from the second cell, the terminal device selects the first cell for access.

Manner 4: The terminal device selects, based on an indication of the network device, the first cell or the second cell for access.

In a possible implementation, based on uplink load statuses of the first cell and the second cell or stipulation in a protocol or the like about selecting the first cell or the second cell by the terminal device for access, the network device may indicate, by sending, to the terminal device, a second message for indicating the terminal device to access the first cell or the second cell, so as to access a corresponding cell. For example, the second message sent by the network device to the terminal device includes 1-bit indication information. When the 1-bit indication information is a first value (for example, a value 0), the terminal device is indicated to access the first cell or that access from the first cell is allowed; or when the 1-bit indication information is a second value (for example, a value 1), the terminal device is indicated to access the second cell or that access from the second cell is allowed. Alternatively, the second message sent by the network device to the terminal device includes 1-bit indication information. When the 1-bit indication information does not appear, the terminal device is indicated to access the first cell or that access from the first cell is allowed; or when the 1-bit indication information appears, the terminal device is indicated to access the second cell or that access from the second cell is allowed.

The second message may be a message sent to the terminal device by the network device in a broadcast (for example, a SIB 1) or multicast manner, or may be RRC dedicated signaling sent by the network device to the terminal device, or the like. This is not limited in this application.

In another possible implementation, the terminal device may be indicated, in a manner such as protocol preconfiguration, that access from the first cell or the second cell is allowed; or the terminal device may directly select, based on a protocol, the first cell or the second cell for access.

It should be noted that when camping on a cell, the terminal device may first not consider a specific uplink carrier from which the terminal device accesses the cell. In other words, the terminal device camps on the first downlink carrier shared by the first cell and the second cell. When the terminal device needs to access a network to enable data communication, the terminal device selects, based on the foregoing rule (for example, the information such as the uplink coverage area of the cell, the uplink load of the cell, and the capability of the terminal device), one (namely, one of the first uplink carrier and the second uplink carrier) of the first cell and the second cell for access. Alternatively, when camping on a cell, the terminal device needs to consider a specific cell from which the terminal device subsequently accesses a network. The terminal device selects, based on the foregoing rule (for example, the information such as the uplink coverage area of the cell, the uplink load of the cell, and the capability of the terminal device), one (namely, one of the first uplink carrier and the second uplink carrier) of the first cell and the second cell for camping. When the terminal device needs to access a network to enable data communication, the terminal device performs access from the cell on which the terminal device currently camps. In this case, that the terminal device selects the first cell or the second cell for access is specifically as follows: The terminal device selects the first cell or the second cell for camping, and performs access from the cell on which the terminal device camps.

In addition, the first cell and the second cell share the first downlink carrier, one PSS/SSS is broadcast on the first downlink carrier, and a physical cell identifier of the cell in which the terminal device is located is obtained through calculation by using the PSS/SSS. Therefore, the first cell and the second cell directly obtain a same physical cell identifier through calculation by using the PSS/SSS. However, in principle, physical cell identities of neighboring cells are different. Therefore, calculation and use of the physical cell identifier in this embodiment of this application may be processed.

Because the first cell and the second cell share the first downlink carrier, a physical layer process, such as receiving (a physical layer behavior of a common part, for a terminal device in an idle state/inactive state) of system information and a paging message on a broadcast channel, sending/receiving (a physical layer behavior of a specific part of a terminal device, for a terminal device in a connected state) of control information on an uplink/downlink control channel, or sending/receiving (a physical layer behavior of a specific part of a terminal device, for a terminal device in a connected state) of data on an uplink/downlink shared channel, can normally work by using both a same physical cell identifier or different physical cell identities. A reason lies in the following: On an uplink, different frequencies (or carriers) may be used to distinguish two cells (the first cell and the second cell); on a downlink with common content, there is no need to distinguish two cells; and a characteristic identifier of a terminal device may be used to distinguish specific content. For a higher layer (above a physical layer) process, the network device needs to search for a context of a terminal device in a connected state by using a physical cell identifier of a cell. Therefore, the terminal device in the idle state/inactive state may not need to identify that the first cell and the second cell correspond to different physical cell identities, and the terminal device in the connected state needs to identify that the first cell and the second cell correspond to different physical cell identities.

In a possible implementation, a physical cell identifier obtained through calculation by using the PSS/SSS may be used as a common physical cell identifier (namely, a first-level physical cell identifier), and different physical cell identities of the first cell and the second cell are configured as specific physical cell identities (namely, second-level physical cell identities). The physical cell identifier of the first cell is different from the physical cell identifier of the second cell. The physical cell identifier of the first cell or the physical cell identifier of the second cell may be the same as the common physical cell identifier. In an example: The common physical cell identifier is a PCI 1, the physical cell identifier of the first cell is a PCI 2, and the physical cell identifier of the second cell is a PCI 3, where the PCI 1, the PCI 2, and the PCI 3 may all be different, or the PCI 1 may be the same as the PCI 2 but different from the PCI 3, or the PCI 1 may be the same as the PCI 3 but different from the PCI 2.

The network device and the terminal device may determine the physical cell identifier of the first cell and the physical cell identifier of the second cell in the following manners.

Manner 1: The network device and the terminal device obtain, based on a physical cell identifier offset parameter, the physical cell identifier of the first cell and the physical cell identifier of the second cell through calculation based on the common physical cell identifier.

In an example, the physical cell identifier offset parameter may be configured for the terminal device according to a predefinition in a protocol or the like, or by being broadcast by the network device. The network device or the terminal device determines the physical cell identifier of the first cell and/or the physical cell identifier of the second cell based on a result of an offset performed on the common physical cell identifier by using the physical cell identifier offset parameter. For example, the network device and the terminal device may determine, as the physical cell identifier of the first cell, a result of one offset performed on the common physical cell identifier by using a physical cell identifier offset parameter 1; and determine, as the physical cell identifier of the second cell, a result of one offset performed on the common physical cell identifier by using a physical cell identifier offset parameter 2. For another example, the network device and the terminal device may determine, as the physical cell identifier of the first cell (or the physical cell identifier of the second cell), a result of one offset performed on the common physical cell identifier by using the physical cell identifier offset parameter; and the common physical cell identifier is the physical cell identifier of the second cell (or the physical cell identifier of the first cell).

Manner 2: The network device sends the physical cell identifier of the first cell and/or the physical cell identifier of the second cell to the terminal device in a broadcast manner or the like. For example, the network device sends a physical cell identifier 1 of the first cell and a physical cell identifier 2 of the second cell to the terminal device. For another example, the network device sends the physical cell identifier of the first cell (or the physical cell identifier of the second cell) to the terminal device, and the common physical cell identifier is the physical cell identifier of the second cell (or the physical cell identifier of the first cell).

In Manner 1 and Manner 2, the terminal device in the idle state/inactive state or the terminal device in the connected state can identify that the first cell and the second cell correspond to different physical cell identities. For communication between the network device and the terminal device, a corresponding physical cell identifier may be determined based on a cell accessed by the terminal device; or a physical layer behavior of a specific part of the terminal device and/or a physical layer behavior of a common part may be indicated, according to an indication from the network device, a predefinition in a protocol, or the like, to use the common physical cell identifier.

Manner 3: The network device may send the physical cell identifier of the first cell and/or the physical cell identifier of the second cell to the terminal device in the connected state by using RRC dedicated signaling. In this case, the terminal device in the idle state/inactive state cannot identify that the first cell and the second cell correspond to different physical cell identities, and the terminal device in the idle state/inactive state uses only the common physical cell identifier. In addition, whether the physical layer behavior of the specific part of the terminal device uses the common physical cell identifier or a specific physical cell identifier of the first cell or the second cell may be further indicated according to an indication from the network device, a predefinition in a protocol, or the like. In this case, the physical layer behavior of the common part can only use the common physical cell identifier.

It should be noted that the physical cell identifier of the first cell and the physical cell identifier of the second cell specifically refer to the specific physical cell identifier corresponding to the first cell and the specific physical cell identifier corresponding to the second cell.

An uplink coverage area of the second cell is greater than an uplink coverage area of the first cell. For the terminal device in the idle state/inactive state, if the first cell and the second cell start neighboring cell measurement and neighboring cell reselection based on a same downlink channel quality threshold value, a problem that the terminal device is not handed over in time in the first cell, or the terminal device is handed over in advance in the second cell occurs. To resolve the foregoing problem, the network device may further send a third message to the terminal device, where the third message includes one or more of a second threshold value, a third threshold value, a fourth threshold value, and a fifth threshold value. The second threshold value is used to start neighboring cell measurement performed on the first cell, the third threshold value is used to start neighboring cell reselection performed on the first cell, the fourth threshold value is used to start neighboring cell measurement performed on the second cell, and the fifth threshold value is used to start neighboring cell reselection performed on the second cell. The terminal device starts, based on the third message, neighboring cell measurement and/or neighboring cell reselection performed on the first cell or the second cell. In a possible implementation, the second threshold value is greater than or equal to the third threshold value, the fourth threshold value is greater than or equal to the fifth threshold value, the second threshold value is less than the fourth threshold value, and the third threshold value is less than the fifth threshold value.

In an example, when the terminal device camps on the first cell or determines to perform access from the first cell, if downlink channel quality of the first cell is less than or equal to the second threshold value, the terminal device starts the neighboring cell measurement performed on the first cell; or if downlink channel quality of the first cell is less than or equal to the third threshold value, the terminal device starts the neighboring cell measurement performed on the first cell. When the terminal device camps on the second cell or determines to perform access from the second cell, if downlink channel quality of the second cell is less than or equal to the fourth threshold value, the terminal device starts the neighboring cell measurement performed on the second cell; or if downlink channel quality of the second cell is less than or equal to the fifth threshold value, the terminal device starts the neighboring cell measurement performed on the second cell.

It should be noted that the neighboring cell measurement includes one or more of intra-frequency (intra-frequency) neighboring cell measurement, inter-frequency (inter-frequency) neighboring cell measurement, and inter-radio access technology (inter-radio access technology, inter-RAT) neighboring cell measurement. For example, the threshold value for starting the neighboring cell measurement may include one or more of a threshold value for starting the intra-frequency neighboring cell measurement, a threshold value for starting the inter-frequency neighboring cell measurement, and a threshold value for starting the inter-radio access technology neighboring cell measurement. The neighboring cell reselection includes one or more of intra-frequency neighboring cell reselection, inter-frequency neighboring cell reselection, and inter-RAT neighboring cell reselection. Specifically, the neighboring cell reselection may include one or more of the intra-frequency neighboring cell reselection, high-priority inter-frequency neighboring cell reselection, equal-priority and low-priority inter-frequency neighboring cell reselection, high-priority inter-RAT neighboring cell reselection, and equal-priority and low-priority inter-RAT neighboring cell reselection. For example, the threshold value for starting the neighboring cell reselection may include one or more of a threshold for starting the intra-frequency neighboring cell reselection, thresholds for starting the high-priority inter-frequency neighboring cell reselection and the high-priority inter-RAT neighboring cell reselection, and thresholds for starting the equal-priority and low-priority inter-frequency neighboring cell reselection and the equal-priority and low-priority inter-RAT neighboring cell reselection.

The third message may be a message sent to the terminal device by the network device in a broadcast (for example, a SIB 1) or multicast manner, or may be RRC dedicated signaling sent by the network device to the terminal device, or the like. This is not limited in this application.

For cell handover performed by the terminal device in the connected state, because cell handover trigger is configured by the network device, regardless of whether the terminal device is connected to the first cell or the second cell, the network device may determine, based on factors such as a capability of the terminal device, an uplink coverage area of the camped cell, and an uplink load of the camped cell, a specific moment at which the terminal device triggers the cell handover.

In addition, a handover execution process after the handover of the existing cell is triggered includes the following. The terminal device receives a reconfiguration with sync (reconfiguration with sync) message sent by the network device, and hands over to a target cell based on a configuration in the reconfiguration with sync message. The process specifically includes the following steps. The terminal device applies a physical cell identifier obtained through calculation on the target cell; the terminal device performs downlink synchronization in the target cell; the terminal device applies a specific broadcast signal configuration of the target cell; the terminal device obtains a master information block (master information block, MIB) of the target cell; the terminal device resets a medium access control (medium access control, MAC) entity; the terminal device applies a new terminal device identifier (namely, a cell radio network temporary identifier (cell radio network temporary identifier. C-RNTI)) in the target cell; the terminal device applies a lower-layer configuration (for example, a primary serving cell configuration (spCellConfigCommon) of a primary network device and/or a secondary network device) based on the received configuration message; and the like.

However, for a special case in which the terminal device hands over from the first cell to the second cell or from the second cell to the first cell, due to a particularity that the first downlink carrier remains unchanged, the terminal device may perform some or none of actions such as the downlink-related downlink synchronization, the specific broadcast signal configuration, master information block obtaining, and medium access control entity resetting (buffer clearing and/or random access in the target cell). In this way, complexity of cell handover performed by the terminal device is reduced, and a data interruption time period caused by the cell handover is shortened.

In a possible implementation, the network device may send a fourth message (the fourth message may be a reconfiguration with sync message or the like) to the terminal device, to indicate the terminal device to hand over from the current cell to the target cell and a configuration of the target cell, where indicating the terminal device to hand over from the current cell to the target cell includes indicating the terminal device to hand over from the first cell to the second cell, or hand over from the second cell to the first cell. After receiving the fourth message sent by the network device, the terminal device hands over to the target cell and applies the configuration of the target cell. Specifically, the configuration of the target cell includes a physical cell identifier and/or a lower-layer configuration. The configuration of the target cell applied by the terminal device includes the physical cell identifier and/or the lower-layer configuration of the target cell.

In an example, the terminal device hands over from the first cell to the second cell, and the terminal device is communicatively connected to the network device by using a physical cell identifier and a lower-layer configuration of the second cell. For example, the physical cell identifier of the second cell of the terminal device may be used by the network device to obtain context information of the terminal device from another network device. The lower-layer configuration includes configuration information related to a physical layer process, for example, one or more of physical layer resource information, physical layer feedback-related information, power-related information, and decoding-related information, so that the terminal device and the network device can normally perform data receiving and sending by using the configuration information.

In addition, when a C-RNTI used after the terminal device hands over from the current cell to the target cell changes, the configuration that is of the target cell and that is indicated by the fourth message further includes a C-RNTI used in the target cell by the terminal device. When handing over to the target cell, the terminal device further applies the C-RNTI used in the target cell.

When the terminal device hands over between the first cell and the second cell, a simplified handover process is performed. To be specific, the terminal device performs some or none of the actions such as the downlink-related downlink synchronization, the specific broadcast signal configuration, the master information block obtaining, and the medium access control entity resetting. The actions may be preconfigured in a protocol. Alternatively, the network device may explicitly or implicitly notify the terminal device. For example, the network device may explicitly indicate, by adding a new field to new RRC signaling or existing RRC signaling, the terminal device to perform a simplified handover process during handover between the first cell and the second cell, or may implicitly indicate, by not carrying a downlink-related configuration in the fourth message (for example, carrying only uplink frequency information but not downlink frequency information), the terminal device to perform a simplified handover process during handover between the first cell and the second cell.

In another possible implementation, the network device may further send information such as the physical cell identifier and/or the lower-layer configuration of the terminal device in the target cell to the terminal device in advance by using RRC signaling or the like. When the terminal device hands over between the first cell and the second cell, the fourth message only indicates the terminal device to hand over between the first cell and the second cell (from the current cell to the target cell), and the terminal device performs a simplified handover process.

In an example, the fourth message may be a new RRC message, an RRC reconfiguration message carrying synchronous reconfiguration. MAC layer signaling (for example, a MAC CE), physical layer signaling (for example, downlink control information (downlink control information, DCI)), or the like.

In addition, it takes a specific time period for the terminal device to parse the fourth message; and different terminal devices have different capabilities of parsing the fourth message, and accordingly require different time periods. Therefore, after the network device sends the fourth message to the terminal device, there is a specific time fuzzy period between the network device and the terminal device. Within the fuzzy period, the network device does not determine whether the terminal device successfully parses the fourth message. To be specific, the network device does not determine whether the terminal device still stays in the original cell or successfully hands over to the target cell. Within the fuzzy period, if the network device still performs data scheduling in the original cell, the terminal device may have handed over to the target cell, and therefore a data loss occurs. Alternatively, if the network device performs data scheduling in the target cell, the terminal device may not hand over to the target cell, and therefore a data loss also occurs. This case is particularly prominent when the network device does not send the configuration of the terminal device in the target cell to the terminal device in advance.

To resolve a problem of data loss in the fuzzy period, in a possible implementation, after sending the fourth message, the network device does not actively start data scheduling (for example, sending or receiving data of the terminal device). When the terminal device successfully hands over to the target cell and sends a scheduling request (scheduling request, SR) to the network device in the target cell, to request the network device to send an uplink grant (UL grant) and an RRC complete message to the terminal device, the network device determines that the terminal device has successfully handed over to the target cell, and the network device starts data scheduling in the target cell.

In another possible implementation, a duration threshold may be indicated by the network device or preconfigured by using a protocol or the like. Timing (for example, starting a timer (timer)) starts when the network device sends the fourth message and when the terminal device receives the fourth message. When the duration threshold is reached (for example, when the timer expires), it is considered that the terminal device has successfully handed over to the target cell, and the network device starts data scheduling in the target cell. Alternatively, the duration threshold may be reported by the terminal device to the network device based on performance of the terminal device.

The foregoing provides description from a perspective that the downlink carrier of the existing cell is multiplexed, the downlink carrier on the TDD band and the uplink carrier on the FDD band flexibly form an uplink-downlink carrier pair, to be paired to form a new cell, and the first message indicates two cells on a same downlink carrier. It may be understood that, alternatively, the downlink carrier on the TDD band and the uplink carrier on the FDD band may flexibly form an uplink-downlink carrier pair, to be paired to form a new cell. The network device directly indicates the new cell to the terminal device, and the terminal device accesses the new cell.

Figure 6:
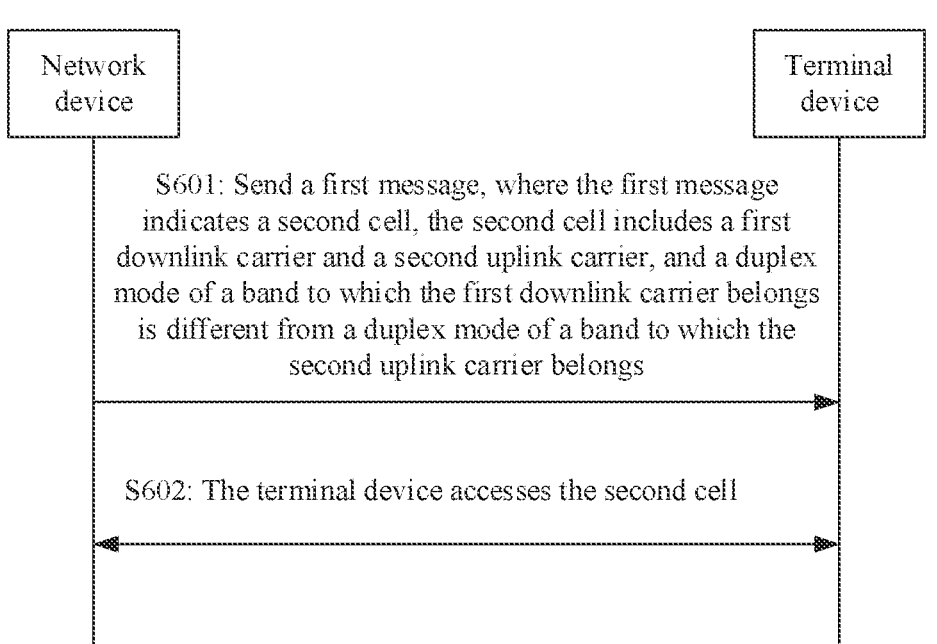
FIG. 6 is a schematic diagram 2 of a communications method according to an embodiment of this application.

FIG. 6 is a schematic diagram of a communications method according to an embodiment of this application. The method includes the following steps.

S601: A network device sends a first message to a terminal device, and the terminal device receives the first message, where the first message indicates a second cell, and the second cell includes a first downlink carrier and a second uplink carrier.

A duplex mode of a band to which the first downlink carrier belongs is different from a duplex mode of a band to which the second uplink carrier belongs. Specifically, it may be that the band to which the first downlink carrier belongs is a TDD band, and the band to which the second uplink carrier belongs is an FDD band; or the band to which the first downlink carrier belongs is an FDD band, and the band to which the second uplink carrier belongs is a TDD band.

S602: The terminal device accesses the second cell.

A band is defined in the 3GPP protocol. For a cell belonging to the TDD band, because a transmit power of the network device is higher than a transmit power of the terminal device, there is a problem that a downlink coverage area of the cell is greater than an uplink coverage area of the cell. However, in actual application, usually, a coverage area of a 5G millimeter-wave downlink carrier is equivalent to that of a 6 GHz uplink carrier, a coverage area of a 6 GHz downlink carrier is equivalent to that of a 2.6 GHz uplink carrier, and a coverage area of a 3.5 GHz downlink carrier is equivalent to that of a 2.1 GHz uplink carrier. To achieve symmetric uplink and downlink coverage areas of a cell, in this embodiment of this application, the downlink carrier belonging to the TDD band and the uplink carrier belonging to the FDD band may flexibly form an uplink-downlink carrier pair, to be paired to form a new cell. Because a lower frequency indicates smaller signal attenuation, in a possible implementation, to make an uplink coverage area and a downlink coverage area of the second cell symmetric, the band to which the second uplink carrier included in the second cell belongs is lower than a band to which a first uplink carrier belongs, as shown in the case of the second cell in FIG. 5.

The second cell may be a cell formed by pairing the downlink carrier on the TDD band and the uplink carrier on the FDD band. Therefore, an originally paired uplink carrier on the TDD band needs to be first unpaired in existing system information, and then a new field is added, to indicate a band number and carrier frequency information of the second uplink carrier of the second cell.

In a possible implementation, as shown in Table 2, the network device may add a new optional field to system information, for example, a UL configuration information 2 field. This field is mandatory when the second cell is indicated by using the system information, and the field indicates uplink configuration information of the second cell. The uplink configuration information of the second cell includes the band number and/or the carrier frequency information of the second uplink carrier, and the network device does not add information to an existing UL configuration information field and an existing SUL configuration information field. Both the terminal device and the network device cancel a pairing relationship between the DL configuration information field and the existing UL configuration information field and the SUL configuration information field. The second uplink carrier configured by using the UL configuration information 2 field and the DL configuration information field is paired with the first downlink carrier, to form a new cell, namely, the second cell.

In another possible implementation, as shown in Table 3, the network device may multiplex the UL configuration information field in the system information to indicate the uplink configuration information of the second cell. The uplink configuration information of the second cell includes the band number and/or the carrier frequency information of the second uplink carrier. Both the terminal device and the network device cancel a pairing relationship between the DL configuration information field and the existing UL configuration information field and the SUL configuration information field. The second uplink carrier configured by using the UL configuration information field and the DL configuration information field is paired with the first downlink carrier, to form a new cell, namely, the second cell.

TABLE 3

System information:
DL configuration information (mandatory)
UL configuration information (indicating

22

TABLE 3-continued new UL configuration information)
SUL configuration information (optional)

As shown in Table 4 and Table 5, on the basis of Table 2 and Table 3, a release indication field that explicitly indicates that the pairing relationship between the existing DL configuration information field and the existing UL configuration information field and the SUL configuration information field is released may be further added. When the second cell is indicated the network device explicitly indicates, to the terminal device by using the release indication field, that the pairing relationship between the existing DL configuration information field and the existing UL configuration information field and the SUL configuration information field is released.

TABLE 4

System information:
DL configuration information (mandatory)
UL configuration information (optional)
SUL configuration information (optional)
UL configuration information 2 (optional)
Release indication field (optional)

TABLE 5

System information:
DL configuration information (mandatory)
UL configuration information (indicating
new UL configuration information)
SUL configuration information (optional)
Release indication field (optional)

In another possible implementation, a new band may be directly defined by using a protocol or the like. An uplink frequency range or a downlink frequency range of an original TDD band may be flexibly paired with a downlink frequency range or an uplink frequency range of an original FDD band, to form a new band. The terminal device works on the new band, and pairs an uplink carrier and a downlink carrier on the new band to form a new cell. The network device may directly indicate downlink configuration information and uplink configuration information of the new band by using the DL configuration information field and the UL configuration information field in the existing system information. The downlink configuration information of the new band includes a band number and/or carrier frequency information of a downlink carrier on the new band, and the uplink configuration information of the new band includes the carrier frequency information of an uplink carrier on the new band. A band number of the uplink carrier on the new band is the same as the band number of the downlink carrier on the new band, and may be carried or may not be carried in the uplink configuration information.

In an example, the network device may send, to the terminal device by using the first message, the system information that can be used to indicate the second cell. The first message may be a message broadcast by the network device in a SIB, or the like.

In addition, it should be understood that, in this embodiment of this application, that a message is used to indicate information, for example, the first message is used to indicate the second cell, or the second message is used to indicate the terminal device to access the first cell or the second cell, usually means that one or more fields in the message are used, or information carried in one or more information indication fields is used to indicate information content that needs to be indicated.

The foregoing mainly describes the solutions provided in this application from a perspective of interaction between the terminal device and the network device. It may be understood that, to implement the foregoing functions, each network element includes a corresponding hardware structure and/or software module (or unit) for performing each function. A person skilled in the art should be easily aware that, with reference to the units and algorithm steps in the examples described in embodiments disclosed in this specification, this application may be implemented by hardware or a combination of hardware and computer software. Whether a function is performed by hardware or hardware driven by computer software depends on a particular application and a design constraint condition that are of the technical solutions. A person skilled in the art may use different methods to implement the described functions for each particular application, but it should not be considered that the implementation goes beyond the scope of this application.

Figure 7:
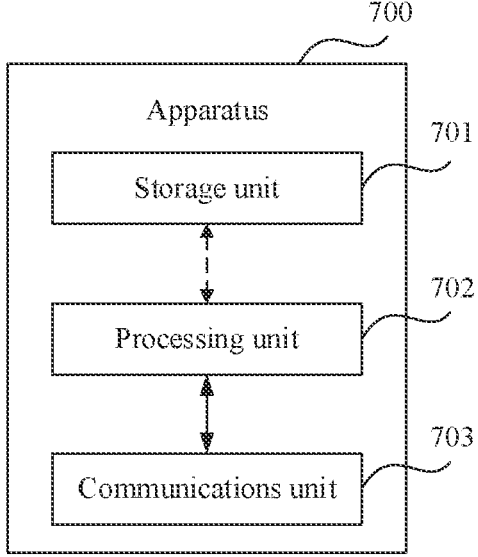
FIG. 7 is a schematic diagram 1 of a communications apparatus according to an embodiment of this application.
Figure 8:
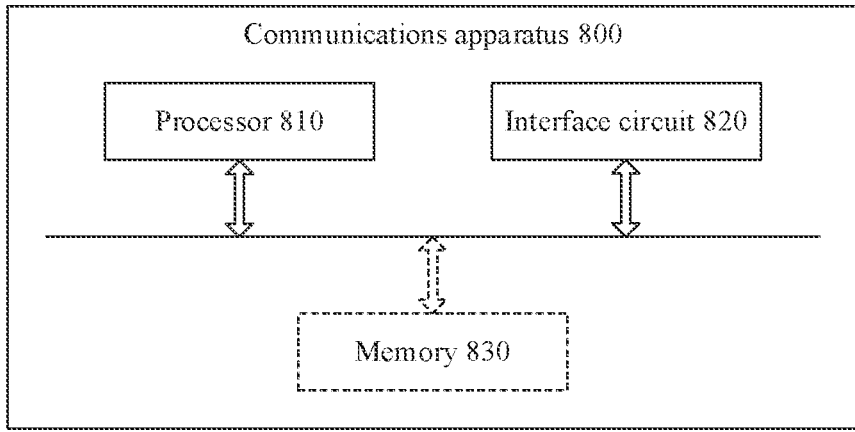
FIG. 8 is a schematic diagram 2 of a communications apparatus according to an embodiment of this application.

FIG. 7 and FIG. 8 are schematic diagrams of structures of possible communications apparatuses according to embodiments of this application. The communications apparatus may be configured to implement functions of the terminal device or the network device in the foregoing method embodiment. Therefore, beneficial effects of the foregoing method embodiment can also be implemented. In this embodiment of this application, the communications apparatus may be the terminal device in FIG. 4 or FIG. 6, or may be the network device in FIG. 4 or FIG. 6, or may be a module (for example, a chip) applied to the terminal device or the network device.

Details are shown in FIG. 7. A communications apparatus 700 may include a processing unit 702 and a communications unit 703, and may further include a storage unit 701. The communications apparatus 700 is configured to implement functions of the terminal device or the network device in the method embodiment shown in FIG. 4 or FIG. 6.

In a possible design, the processing unit 702 is configured to implement a corresponding processing function. The communications unit 703 is configured to support the communications apparatus 700 in communicating with another network entity. The storage unit 701 is configured to store program code and/or data of the communications apparatus 700. Optionally, the communications unit 703 may include a receiving unit and/or a sending unit, respectively configured to perform a receiving operation and a sending operation.

When the communications apparatus 700 is configured to implement the functions of the terminal device in the method embodiment, a case is as follows.

In a possible implementation, the communications unit 703 is configured to receive a first message from a network device, where the first message indicates a first cell and a second cell, the first cell includes a first downlink carrier and a first uplink carrier, the second cell includes the first downlink carrier and a second uplink carrier, a duplex mode of a band to which the first downlink carrier belongs is the same as a duplex mode of a band to which the first uplink carrier belongs, and the duplex mode of the band to which the first downlink carrier belongs is different from a duplex mode of a band to which the second uplink carrier belongs.

The processing unit 702 is configured to select the first cell or the second cell for access.

In a possible design, the band to which the first downlink carrier belongs is the same as the band to which the first uplink carrier belongs, and the band to which the second uplink carrier belongs is lower than the band to which the first uplink carrier belongs.

In a possible design, when selecting the first cell or the second cell for access, the processing unit 702 is specifically configured to obtain downlink channel quality of the first cell or the second cell. When the downlink channel quality is greater than or equal to a first threshold value, the processing unit 702 selects the first cell for access; or when the downlink channel quality is less than a first threshold value, the processing unit 702 selects the second cell for access.

In a possible design, the first threshold value is indicated by the network device or preconfigured.

In a possible design, when selecting the first cell or the second cell for access, the processing unit 702 is specifically configured to obtain uplink load information of the first cell and the second cell. When an uplink load of the first cell is less than or equal to an uplink load of the second cell, the processing unit 702 selects the first cell for access; or when an uplink load of the first cell is greater than an uplink load of the second cell, the processing unit 702 selects the second cell for access.

In a possible design, when selecting the first cell or the second cell for access, the processing unit 702 is specifically configured to: when the processing unit 702 supports access from the second cell, select the second cell for access; or when the processing unit 702 does not support access from the second cell, select the first cell for access.

In a possible design, the communications unit 703 is further configured to receive a second message from the network device, where the second message indicates accessing the first cell or accessing the second cell.

When selecting the first cell or the second cell for access, the processing unit 702 is specifically configured to: select, based on the second message, the first cell or the second cell for access.

In a possible design, the communications unit 703 is further configured to receive a third message from the network device, where the third message includes one or more of a second threshold value, a third threshold value, a fourth threshold value, and a fifth threshold value; the second threshold value and the third threshold value are used to start neighboring cell measurement and neighboring cell reselection performed on the first cell; and the fourth threshold value and the fifth threshold value are used to start neighboring cell measurement and neighboring cell reselection performed on the second cell. The processing unit 702 is further configured to: start, based on the third message, neighboring cell measurement and/or neighboring cell reselection performed on the first cell or the second cell.

In a possible design, the communications unit 703 is further configured to receive a fourth message from the network device, where the fourth message indicates to hand over from a current cell to a target cell and indicates a configuration of the target cell, the configuration of the target cell includes a physical cell identifier of the target cell and/or a lower-layer configuration, and indicating to hand over from the current cell to the target cell includes indicating to hand over from the first cell to the second cell or hand over from the second cell to the first cell. The processing unit 702 is further configured to: hand over to the target cell and apply the physical cell identifier of the target cell and/or the lower-layer configuration.

In a possible design, when the configuration of the target cell further includes a cell radio network temporary identifier C-RNTI used in the target cell, the processing unit 702 hands over to the target cell and applies the C-RNTI, the physical cell identifier of the target cell, and/or the lower-layer configuration.

In a possible design, the processing unit 702 is further configured to: determine a common physical cell identifier based on a primary synchronization signal SSS and/or secondary synchronization information PSS of the first downlink carrier, and determine a physical cell identifier of the first cell and a physical cell identifier of the second cell based on the common physical cell identifier.

In another possible implementation, the communications unit 703 is configured to receive a first message from a network device, where the first message indicates a second cell, the second cell includes a first downlink carrier and a second uplink carrier, and a duplex mode of a band to which the first downlink carrier belongs is different from a duplex mode of a band to which the second uplink carrier belongs.

The processing unit 702 is configured to access the second cell.

In a possible design, the band to which the second uplink carrier belongs is lower than the band to which the first downlink carrier belongs.

When the communications apparatus 700 is configured to implement the functions of the network device in the method embodiment, a case is as follows.

The processing unit 702 is configured to determine a first message, where the first message indicates a first cell and a second cell, the first cell includes a first downlink carrier and a first uplink carrier, the second cell includes the first downlink carrier and a second uplink carrier, a duplex mode of a band to which the first downlink carrier belongs is the same as a duplex mode of a band to which the first uplink carrier belongs, and the duplex mode of the band to which the first downlink carrier belongs is different from a duplex mode of a band to which the second uplink carrier belongs.

The communications unit 703 is configured to send the first message to a terminal device.

In a possible design, the band to which the first downlink carrier belongs is the same as the band to which the first uplink carrier belongs, and the band to which the second uplink carrier belongs is lower than the band to which the first uplink carrier belongs.

In a possible design, the communications unit 703 is further configured to send a second message to the terminal device, where the second message indicates the terminal device to access the first cell or access the second cell.

In a possible design, the communications unit 703 is further configured to send a third message to the terminal device, where the third message includes one or more of a second threshold value, a third threshold value, a fourth threshold value, and a fifth threshold value; the second threshold value and the third threshold value are used to start neighboring cell measurement and neighboring cell reselection performed on the first cell; and the fourth threshold value and the fifth threshold value are used to start neighboring cell measurement and neighboring cell reselection performed on the second cell.

In a possible design, the communications unit 703 is further configured to send a fourth message to the terminal device, where the fourth message indicates the terminal device to hand over from a current cell to a target cell and indicates a configuration of the target cell, the configuration of the target cell includes a physical cell identifier of the target cell and/or a lower-layer configuration, and indicating the terminal device to hand over from the current cell to the target cell includes indicating the terminal device to hand over from the first cell to the second cell or hand over from the second cell to the first cell.

In a possible design, when a cell radio network temporary identifier C-RNTI used by the terminal device to hand over from the current cell to the target cell changes, the configuration of the target cell further includes a C-RNTI used in the target cell by the terminal device.

In a possible design, the processing unit 702 is further configured to: start data scheduling in the target cell when duration in which the communications unit 703 sends the fourth message reaches a duration threshold, or start data scheduling in the target cell when the communications unit 703 receives a scheduling request sent by the terminal device in the target cell.

In another possible implementation, the processing unit 702 is configured to determine a first message, where the first message indicates a second cell, the second cell includes a first downlink carrier and a second uplink carrier, and a duplex mode of a band to which the first downlink carrier belongs is different from a duplex mode of a band to which the second uplink carrier belongs.

The communications unit 703 is configured to send the first message to a terminal device.

In a possible design, the band to which the second uplink carrier belongs is lower than the band to which the first downlink carrier belongs.

For more detailed descriptions of the processing unit 702 and the communications unit 703, directly refer to related descriptions of the method embodiment shown in FIG. 4 or FIG. 6. Details are not described herein.

As shown in FIG. 8, a communications apparatus 800 includes a processor 810 and an interface circuit 820. The processor 810 and the interface circuit 820 are coupled to each other. It may be understood that the interface circuit 820 may be a transceiver or an input/output interface. Optionally, the communications apparatus 800 may further include a memory 830, configured to: store instructions to be executed by the processor 810, store input data required for running the instructions by the processor 810, or store data generated after the processor 810 runs the instructions.

When the communications apparatus 800 is configured to implement the method shown in FIG. 4 or FIG. 6, the processor 810 is configured to implement a function of the processing unit 702, and the interface circuit 820 is configured to implement a function of the communications unit 703.

In another form of this embodiment, a computer-readable storage medium is provided. The computer-readable storage medium stores instructions. When the instructions are executed, the communications method applicable to the terminal device or the network device in the foregoing method embodiments may be performed.

In another form of this embodiment, a computer program product including instructions is provided. When the instructions are executed, the communications method applicable to the terminal device or the network device in the foregoing method embodiments may be performed.

In another form of this embodiment, a chip is provided. When the chip runs, the communications method applicable to the terminal device or the network device in the foregoing method embodiments may be performed.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine, so that instructions executed by a processor of a computer or another programmable data processing device generates an apparatus for implementing a function specified in one or more processes in the flowcharts and/or one or more blocks in the block diagrams.

These computer program instructions may also be stored in a computer-readable memory capable of directing a computer or other programmable data processing device to work in a particular manner, so that instructions stored in the computer-readable memory generate a manufacture including an instruction apparatus, and the instruction apparatus implements a function specified in one or more processes in the flowcharts and/or one or more blocks in the block diagrams.

These computer program instructions may also be loaded onto a computer or another programmable data processing device, so that a series of operation steps are performed on the computer or the another programmable device to produce computer-implemented processing. Therefore, the instructions executed on the computer or the another programmable device provide steps for implementing functions specified in one or more processes in the flowcharts and/or one or more blocks in the block diagrams.

Although some embodiments of this application have been described, persons skilled in the art may make changes and modifications to these embodiments once they learn the basic inventive concept. Therefore, the following claims are intended to be construed as to cover the preferred embodiments and all changes and modifications falling within the scope of this application.

It is clear that, a person skilled in the art may make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. A communications method applied to a terminal device and comprising:

receiving, from a network device, a first message indicating a first cell and a second cell, wherein the first cell comprises a first downlink carrier and a first uplink carrier, wherein the second cell comprises the first downlink carrier and a second uplink carrier, wherein a first duplex mode of a band to which the first downlink carrier belongs is the same as a second duplex mode of a band to which the first uplink carrier belongs, and wherein the first duplex mode is different from a third duplex mode of a band to which the second uplink carrier belongs;

determining a common physical cell identifier based on at least one of a primary synchronization signal (PSS) or a secondary synchronization signal (SSS) of the first downlink carrier;

determining a first physical cell identifier of the first cell and a second physical cell identifier of the second cell based on the common physical cell identifier, wherein the first physical cell identifier is different from the second physical cell identifier;

selecting the first cell or the second cell as a selected cell for access; and communicating with the network device using the selected cell.

2. The method of claim 1, wherein the band to which the first downlink carrier belongs is the same as the band to which the first uplink carrier belongs, and wherein the band to which the second uplink carrier belongs is lower than the band to which the first uplink carrier belongs.

3. The method of claim 1, wherein selecting the first cell or the second cell for access comprises:

obtaining a downlink channel quality of the first cell;

selecting, when the downlink channel quality is greater than or equal to a first threshold value, the first cell for access; and selecting, when the downlink channel quality is less than the first threshold value, the second cell for access.

4. The method of claim 3, wherein the first threshold value is preconfigured in the terminal device, and wherein the method further comprises receiving the first threshold value from the network device.

5. The method of claim 1, wherein selecting the first cell or the second cell for access comprises:

obtaining uplink load information of the first cell and the second cell;

selecting, when a first uplink load of the first cell is less than or equal to a second uplink load of the second cell, the first cell for access; and selecting, when the first uplink load is greater than the second uplink load, the second cell for access.

6. The method of claim 1, wherein selecting the first cell or the second cell for access comprises:

selecting, when the terminal device supports access from the second cell, the second cell for access; and selecting, when the terminal device does not support access from the second cell, the first cell for access.

7. The method of claim 1, further comprising receiving, from the network device, a second message instructing the terminal device to access the first cell or access the second cell, wherein the selecting the first cell or the second cell for access comprises selecting, by the terminal device based on the second message, the first cell or the second cell for access.

8. The method of claim 1, further comprising:

receiving, from the network device, a third message comprising one or more of a second threshold value, a third threshold value, a fourth threshold value, or a fifth threshold value, wherein the second threshold value and the third threshold value initiate first neighboring cell measurement and neighboring cell reselection performed on the first cell, and wherein the fourth threshold value and the fifth threshold value initiate second neighboring cell measurement and neighboring cell reselection performed on the second cell; and starting, based on the third message, at least one of the neighboring cell measurement or neighboring cell reselection performed on the first cell or the second cell.

9. The method of claim 1, further comprising:

receiving, from the network device, a fourth message instructing the terminal device to hand over from a current cell to a target cell, wherein the fourth message indicates a configuration of the target cell comprising at least one of a physical cell identifier of the target cell or a lower-layer configuration, and wherein instructing the terminal device to hand over from the current cell to the target cell comprises instructing the terminal device to hand over from the first cell to the second cell or to hand over from the second cell to the first cell;

handing over to the target cell; and applying at least one of the physical cell identifier of the target cell or the lower-layer configuration.

10. The method of claim 9, further comprising:

handing over, when the configuration of the target cell further comprises a cell radio network temporary identifier (C-RNTI) used in the target cell by the terminal device, to the target cell; and applying at least one of the C-RNTI, the physical cell identifier of the target cell, or the lower-layer configuration.

11. A communications method, comprising:

receiving, from a network device, a first message indicating a second cell, wherein the second cell comprises a first downlink carrier and a second uplink carrier, and wherein a first duplex mode of a band to which the first downlink carrier belongs is different from a second duplex mode of a band to which the second uplink carrier belongs;

determining a common physical cell identifier based on at least one of a primary synchronization signal (PSS) or a secondary synchronization signal (SSS) of the first downlink carrier;

determining a second physical cell identifier of the second cell based on the common physical cell identifier, wherein the second physical cell identifier is different from a first physical cell identifier of a first cell;

accessing the second cell; and communicating with the network device using the second cell.

12. The method of claim 11, wherein the band to which the second uplink carrier belongs is lower than the band to which the first downlink carrier belongs.

13. A terminal device comprising:

a memory configured to store instructions; and a processor coupled to the memory and configured to execute the instructions to cause the terminal device to:

receive a first message from a network device, wherein the first message indicates a first cell and a second cell, the first cell comprises a first downlink carrier and a first uplink carrier, the second cell comprises the first downlink carrier and a second uplink carrier, a first duplex mode of a band to which the first downlink carrier belongs is the same as a second duplex mode of a band to which the first uplink carrier belongs, and the first duplex mode of the band to which the first downlink carrier belongs is different from a third duplex mode of a band to which the second uplink carrier belongs;

determine a common physical cell identifier based on at least one of a primary synchronization signal (PSS) or a secondary synchronization signal (SSS) of the first downlink carrier;

determine a first physical cell identifier of the first cell and a second physical cell identifier of the second cell based on the common physical cell identifier, wherein the first physical cell identifier is different from the second physical cell identifier;

select the first cell or the second cell as a selected cell for access; and communicate with the network device using the selected cell.

14. The terminal device of claim 13, wherein the band to which the first downlink carrier belongs is the same as the band to which the first uplink carrier belongs, and wherein the band to which the second uplink carrier belongs is lower than the band to which the first uplink carrier belongs.

15. The terminal device of claim 13, wherein the terminal device being configured to select the first cell or the second cell for access comprises the processor being further configured to execute the instructions to cause the terminal device to:

obtain downlink channel quality of the first cell;

select, when the downlink channel quality is greater than or equal to a first threshold value, the first cell for access; and select, when the downlink channel quality is less than the first threshold value, the second cell for access.

16. The terminal device of claim 13, wherein the terminal device being configured to select the first cell or the second cell for access comprises the processor being further configured to execute the instructions to cause the terminal device to:

obtain uplink load information of the first cell and the second cell;

select, when a first uplink load of the first cell is less than or equal to a second uplink load of the second cell, the first cell for access; and select, when the first uplink load is greater than the second uplink load, the second cell for access.

17. The terminal device of claim 13, wherein the terminal device being configured to select the first cell or the second cell for access comprises the processor being further configured to execute the instructions to cause the terminal device to:

select, when the terminal device supports access from the second cell, the second cell for access; and select, when the terminal device does not support access from the second cell, the first cell for access.

18. The terminal device of claim 13, wherein the processor is further configured to execute the instructions to cause the terminal device to receive, from the network device, a second message instructing the terminal device to access the first cell or access the second cell, and wherein the terminal device is configured to select the first cell or the second cell for access by being configured to select, by the terminal device based on the second message, the first cell or the second cell for access.

19. The terminal device of claim 13, wherein the processor is further configured to execute the instructions to cause the terminal device to:

receive, from the network device, a third message comprising one or more of a second threshold value, a third threshold value, a fourth threshold value, or a fifth threshold value, wherein the second threshold value and the third threshold value initiate first neighboring cell measurement and neighboring cell reselection performed on the first cell, and wherein the fourth threshold value and the fifth threshold value initiate second neighboring cell measurement and neighboring cell reselection performed on the second cell; and start, based on the third message, at least one of the neighboring cell measurement or neighboring cell reselection performed on the first cell or the second cell.

20. The method of claim 1, wherein determining the first physical cell identifier of the first cell and the second physical cell identifier of the second cell comprises:

determining at least one of the first physical cell identifier or the second physical cell identifier based on a result of an offset of the common physical cell identifier using a physical cell identifier offset parameter;

receiving, from the network device in a broadcast manner, at least one of the first physical cell identifier or the second physical cell identifier; or receiving, from the network device using radio resource control (RRC) dedicated signaling, at least one of the first physical cell identifier or the second physical cell identifier.

* * * * *